(12) United States Patent
Takeichi et al.

(10) Patent No.: US 11,844,304 B2
(45) Date of Patent: Dec. 19, 2023

(54) AUTONOMOUS TRAVEL WORK MACHINE

(71) Applicant: HONDA MOTOR CO., LTD., Tokyo (JP)

(72) Inventors: Masashi Takeichi, Wako (JP); Kouki Tsuruda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 443 days.

(21) Appl. No.: 17/141,358

(22) Filed: Jan. 5, 2021

(65) Prior Publication Data
US 2021/0212253 A1    Jul. 15, 2021

(30) Foreign Application Priority Data

Jan. 9, 2020    (JP) ................... 2020-002042

(51) Int. Cl.
*G05D 1/02* (2020.01)
*A01D 34/82* (2006.01)
*A01D 34/64* (2006.01)
*A01D 101/00* (2006.01)
*A01D 34/00* (2006.01)

(52) U.S. Cl.
CPC ......... *A01D 34/008* (2013.01); *A01D 34/828* (2013.01); *G05D 1/021* (2013.01); *A01D 34/64* (2013.01); *A01D 2101/00* (2013.01); *G05D 2201/0208* (2013.01)

(58) Field of Classification Search
CPC .... A01D 34/008; A01D 34/828; A01D 34/64; A01D 2101/00; G05D 1/021; G05D 2201/0208
USPC .......................................... 701/23
See application file for complete search history.

(56) References Cited

FOREIGN PATENT DOCUMENTS

| CN | 207810515 U | * | 9/2018 | |
|---|---|---|---|---|
| EP | 3549426 A1 | * | 10/2019 | ........... A01D 34/001 |
| JP | 2018-102247 | | 7/2018 | |
| WO | WO-2020007289 A1 | * | 1/2020 | ............. A01D 34/64 |

* cited by examiner

*Primary Examiner* — Mahmoud Gimie
(74) *Attorney, Agent, or Firm* — Rankin, Hill & Clark LLP (57) ABSTRACT

An autonomous travel work machine includes a main body and a wheel, and is configured to execute a predetermined operation on an operation target while causing the main body to autonomously travel with the wheel. The autonomous travel work machine includes: an operation unit having a shape projecting from an upper face of the main body, the operation unit being operated by being pressed from an upper face side; and a protection unit located at a front side in a traveling direction of the main body relative to the operation unit, the protection unit being disposed at a height equal to or higher than an upper end of the operation unit.

9 Claims, 7 Drawing Sheets

AUTONOMOUS TRAVEL WORK MACHINE

INCORPORATION BY REFERENCE

The present application claims priority under 35 U.S.C. § 119 to Japanese Patent Application No. 2020-002042 filed on Jan. 9, 2020. The content of the application is incorporated herein by reference in its entirety.

BACKGROUND OF THE INVENTION

Field of the Invention

The present invention relates to an autonomous travel work machine.

Description of the Related Art

A robot lawn mower is conventionally known as an example of an autonomous travel work machine. The robot lawn mower performs an operation of autonomously traveling on the lawn ground and mowing the lawn grass as an operation target. Such a robot lawn mower may include an operation unit to enable a user to stop the robot lawn mower in case of emergency. An emergency stop switch that is pressed by a user to stop the lawn mower is known as an example of the operation unit (e.g., refer to Japanese Patent Laid-Open No. 2018-102247). The emergency stop switch is mounted on an upper face of the robot lawn mower and pressed to stop travel of the robot lawn mower and an operation of mowing the lawn grass.

Inside a lawn mowing area, an installation object, such as a solar panel, located above the robot lawn mower may be provided.

When the robot lawn mower travels under such an installation object, the emergency stop switch on the upper face may come into contact with the installation object and thus come into operation, thereby stopping travel and operation of the robot lawn mower. Thus, the robot lawn mower may be stopped without completing the operation of mowing the lawn grass in the entire lawn mowing area.

It is an object of the present invention to provide an autonomous travel work machine capable of reliably executing a predetermined operation in an operation area.

SUMMARY OF THE INVENTION

An aspect of the present invention provides an autonomous travel work machine including a main body and a wheel, the autonomous travel work machine being configured to execute a predetermined operation on an operation target while causing the main body to autonomously travel with the wheel, the autonomous travel work machine including: an operation unit having a shape projecting from an upper face of the main body, the operation unit being operated by being pressed from an upper face side; and a protection unit located at a front side in a traveling direction of the main body relative to the operation unit, the protection unit being disposed at a height equal to or higher than an upper end of the operation unit.

According to an aspect of the present invention, in the above autonomous travel work machine, the protection unit is disposed at a lateral side of the operation unit.

According to an aspect of the present invention, in the above autonomous travel work machine, the protection unit is disposed with a predetermined space from the operation unit.

According to an aspect of the present invention, in the above autonomous travel work machine, the protection unit includes a pipe-shaped member.

According to an aspect of the present invention, in the above autonomous travel work machine, the protection unit is fixed to the main body at a predetermined fixed point and attached to the main body turnably about the fixed point serving as a turning center.

According to an aspect of the present invention, in the above autonomous travel work machine, the protection unit is detachably attached to the main body.

According to an aspect of the present invention, in the above autonomous travel work machine, the main body includes: a driving unit configured drive the wheel to cause the main body to travel; a work unit configured to execute the predetermined operation on the operation target; and a control unit configured to control the driving unit and the work unit, and the control unit performs control to stop the driving unit and the work unit by the operation unit being pressed.

According to the above aspects of the present invention, it is possible to reliably execute a predetermined operation in an operation area.

DETAILED DESCRIPTION OF THE PREFERRED EMBODIMENT

Hereinbelow, an embodiment of the present invention will be described with reference to the drawings.

Figure 1:
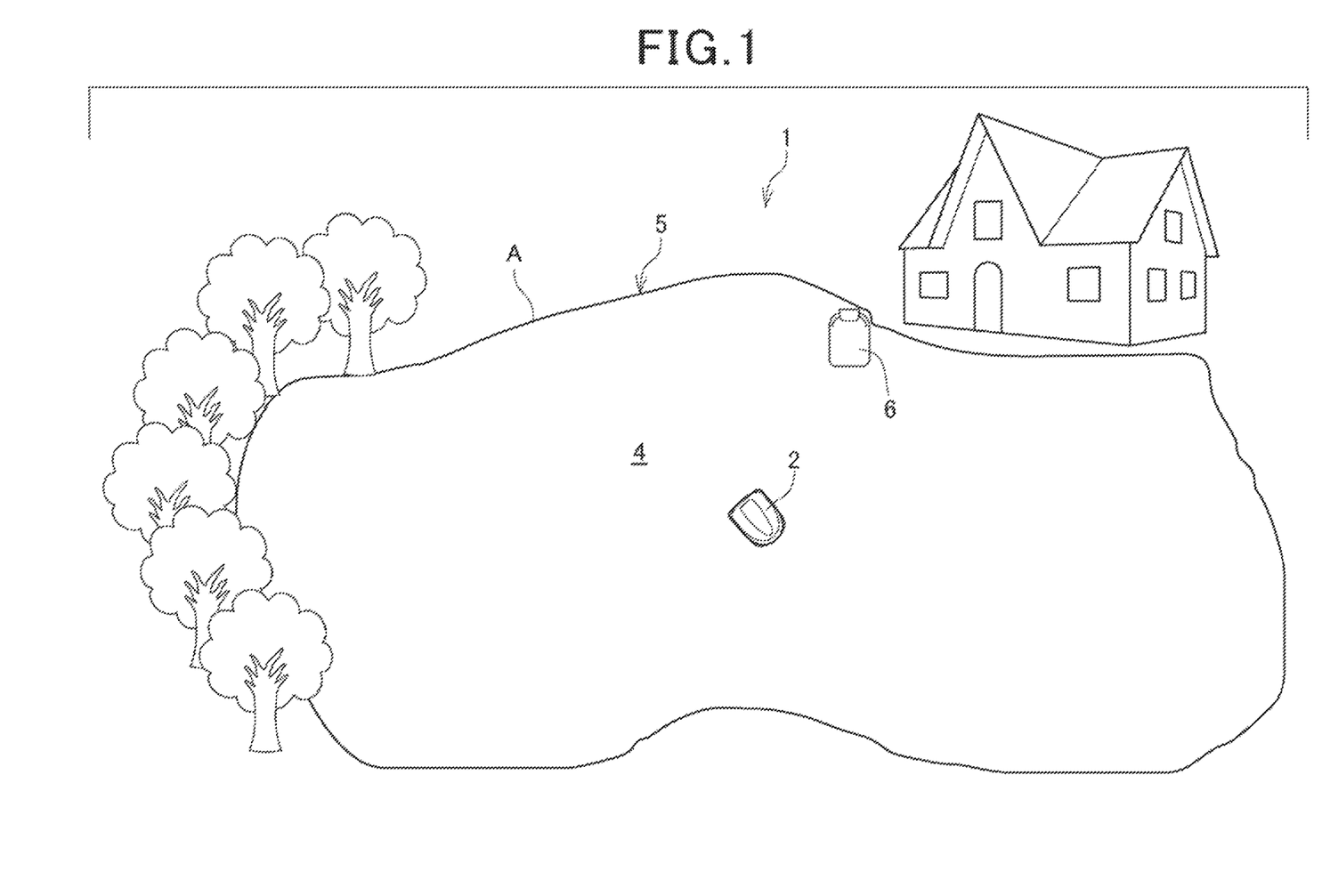
FIG. 1 is a diagram showing the configuration of an unattended lawn mowing system according to an embodiment of the present invention.

FIG. 1 is a diagram showing an example of the configuration of an unattended lawn mowing system 1 according to the present embodiment.

The unattended lawn mowing system 1 includes a robot lawn mower 2, an area wire 5 which defines a lawn mowing area 4 as a target area where a lawn mowing operation is executed, and a charging station 6.

The robot lawn mower 2 is an autonomous travel work machine that mows lawn grass as an example of the "operation target" while autonomously traveling inside the lawn mowing area 4 without a person in attendance. The area wire 5 is a member that is laid along a boundary A of the lawn mowing area 4 by, for example, an operator to enable the robot lawn mower 2 to detect the boundary A. In the present embodiment, the laid area wire 5 transmits a predetermined signal, and the robot lawn mower 2 detects the signal from the area wire 5 to detect the boundary A of the lawn mowing area 4. The robot lawn mower 2 corresponds to an example of the "autonomous travel work machine." Hereinbelow, the robot lawn mower 2 is merely referred to as the lawn mower 2 for convenience of description.

The charging station 6 is a charging device that charges the lawn mower 2. The charging station 6 is installed inside the lawn mowing area 4. The charging station 6 is also a standby place of the lawn mower 2 when the lawn mower 2 is not in operation. The lawn mower 2 returns to the charging station 6 by autonomous travel when the lawn mowing operation is finished and is appropriately charged in the charging station 6.

Although the present embodiment describes the unattended lawn mowing system 1 including one lawn mower 2, the present invention is not limited thereto. The unattended lawn mowing system 1 may include two or more lawn mowers 2. In this case, the unattended lawn mowing system 1 may include a plurality of charging stations 6.

Figure 2:
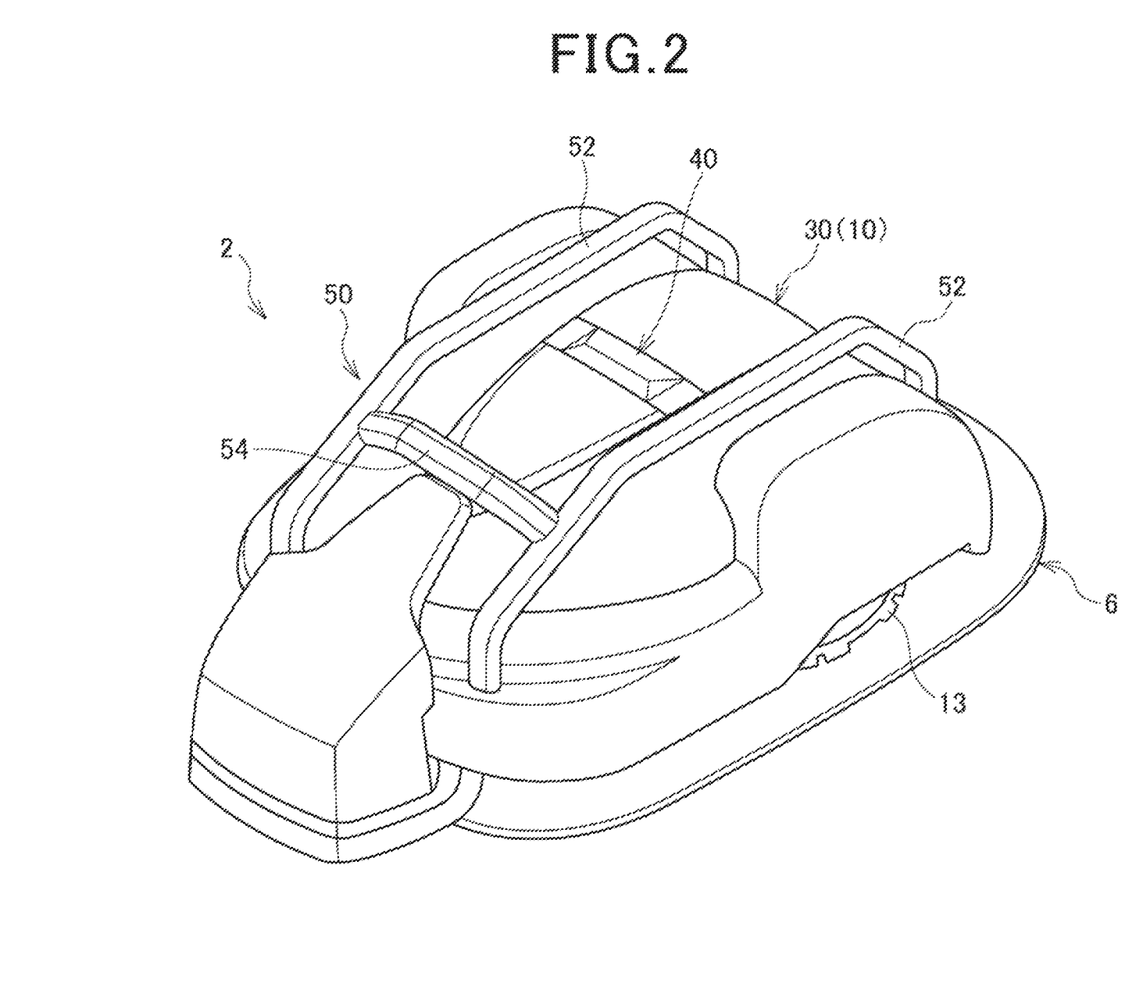
FIG. 2 is a perspective view showing the configuration of a lawn mower.
Figure 3:
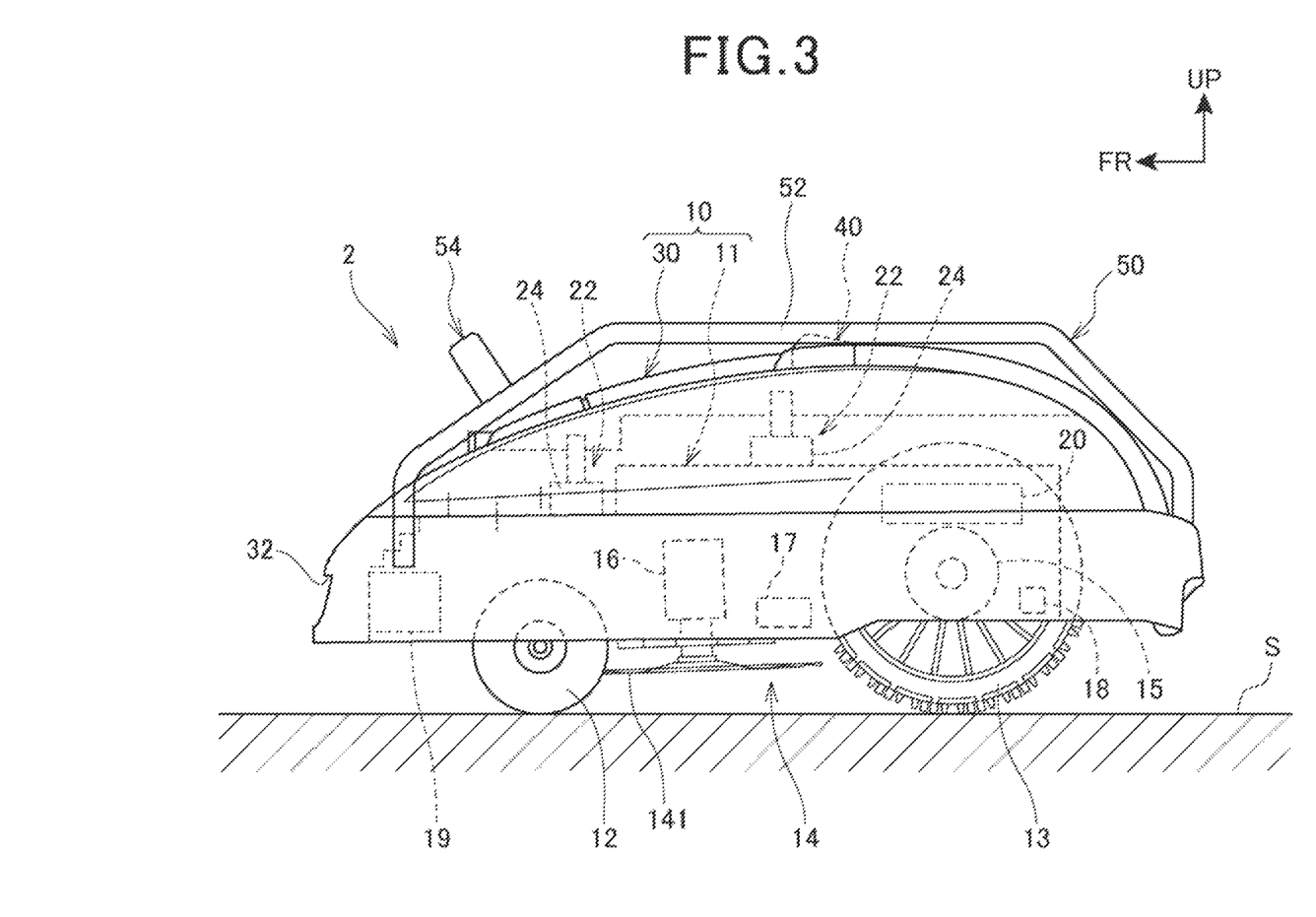
FIG. 3 is a side view showing the configuration of the lawn mower.
Figure 4:
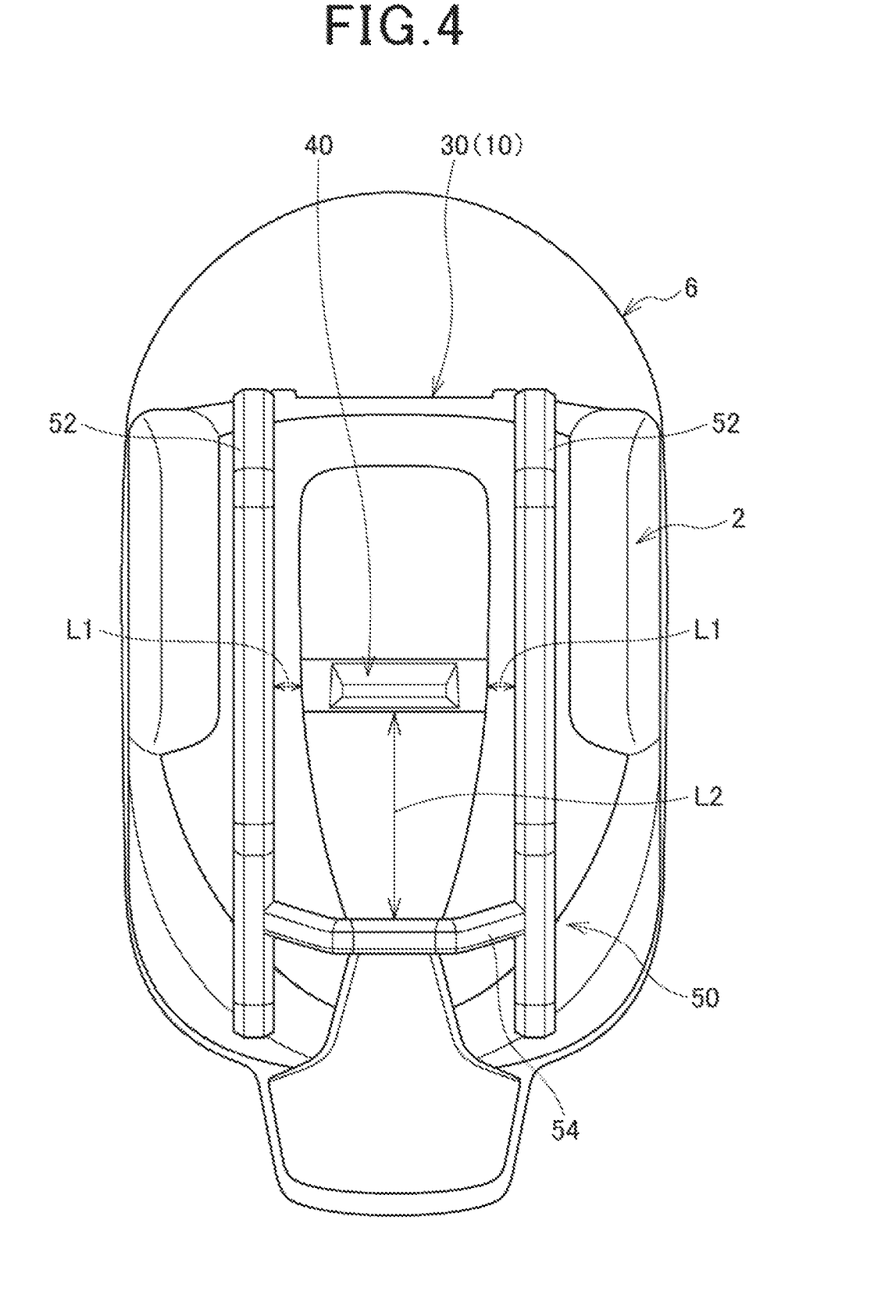
FIG. 4 is a top view showing the configuration of the lawn mower.
Figure 5:
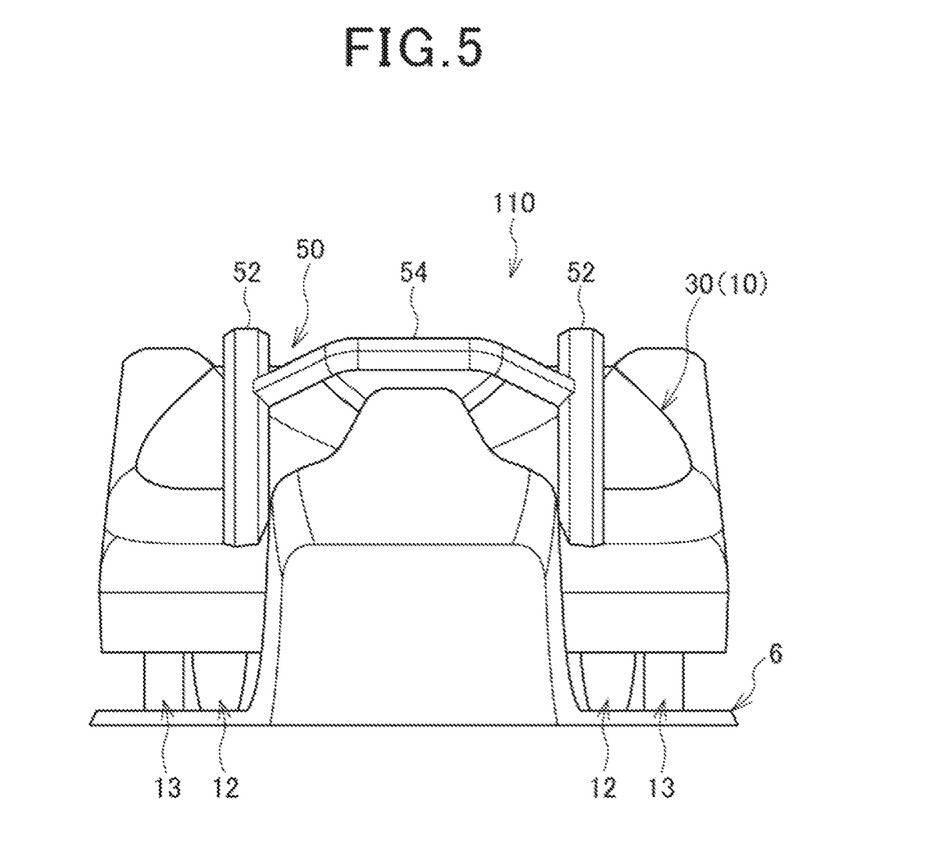
FIG. 5 is a front view showing the configuration of the lawn mower.

FIG. 2 is a perspective view showing the configuration of the lawn mower 2, and FIG. 3 is a side view showing an example of the configuration of the lawn mower 2. FIG. 4 is a top view showing the configuration of the lawn mower 2, and FIG. 5 is a front view showing the configuration of the lawn mower 2. FIGS. 2, 4, and 5 show the lawn mower 2 placed on the charging station 6.

As shown in FIGS. 2 and 3, the lawn mower 2 includes a housing 11, front wheels 12 which are disposed on the right and left sides of a front part of the housing 11, rear wheels 13 which are disposed on the right and left sides of a rear part of the housing 11, and a work unit 14 which is disposed under the center of the housing 11. The work unit 14 includes a cutting blade disc 141. The cutting blade disc 141 includes a cutting blade that cuts the lawn grass. The lawn mower 2 includes a terminal unit 19 which is disposed in a front part of the lawn mower 2 and electrically connectable to the charging station 6.

The lawn mower 2 includes right and left traveling motors 15 which correspond to an example of the "driving unit," a work unit driving motor 16, a battery 17, a wheel speed sensor 18, and a control unit 20 which controls each part of the lawn mower 2, all of which are housed in the housing 11.

The right and left traveling motors 15 individually drive the right and left rear wheels 13, respectively. The lawn mower 2 travels by the traveling motors 15 driving the rear wheels 13 in accordance with an instruction from the control unit 20.

The work unit driving motor 16 rotationally drives the cutting blade disc 141 of the work unit 14. The lawn mowing operation is executed by the work unit driving motor 16 rotationally driving the cutting blade disc 141 of the work unit 14 in accordance with an instruction from the control unit 20.

The battery 17 supplies operation power to each part of the lawn mower 2. The wheel speed sensor 18 detects the rotation speed of the right and left rear wheels 13 as driving wheels. A detection signal of the wheel speed sensor 18 is transmitted to the control unit 20.

The control unit 20 is, for example, an electronic circuit unit including a processor, such as a CPU or an MPU, and a memory, such as a RAM or a ROM.

The control unit 20 functions as various control means including autonomous travel control which controls the traveling motors 15 for autonomous travel and lawn mowing operation control which controls the work unit driving motor 16 for the lawn mowing operation by the processor executing programs stored in the memory. Moreover, the control unit 20 also functions as an information acquisition unit that receives a detection result transmitted from each part of the lawn mower 2.

The lawn mower 2 includes a cover 30 which covers the housing 11. The cover 30 covers a front face, a rear face, each side face, and an upper face of the housing 11 and includes an open lower end. Thus, a lower face of the housing 11 and the cutting blade disc 141 are exposed from the lower end of the cover 30. The cover 30 of the present embodiment includes a side face curved over the entire circumference.

The cover 30 of the present embodiment is made of a resin material and functions as, for example, a protection cover that protects the housing 11 from rainwater, dust, and the like from attaching to the housing 11 and a decorative cover that improves the appearance. Note that the cover 30 may be made of not the resin material, but another material.

A plurality of holding devices 22 is attached to the upper face of the housing 11. The cover 30 is held by the holding devices 22 displaceably in the horizonal direction and the up-down direction with respect to the housing 11. In the present embodiment, three holding devices 22 in total are provided. One of the holding devices 22 is attached to the front side of the housing 11, and two of the holding devices 22 are attached to the rear side thereof. The lower end of the cover 30 is disposed with a predetermined distance from a traveling surface S on which the lawn mower 2 travels.

Each of the holding devices 22 includes a displacement sensor 24. The displacement sensor 24 functions as a "detection unit" that detects a displacement of the holding device 22 and is capable of detecting a displacement between the housing 11 and the cover 30 through the holding device 22. A detection signal of the displacement sensor 24 is transmitted to the control unit 20.

In the present embodiment, the control unit 20 detects a collision between the lawn mower 2 and an obstacle by acquiring a signal from the displacement sensor 24.

That is, the displacement sensor 24 functions as a contact sensor of the lawn mower 2 and generates a signal indicating that an obstacle is present on a path of the lawn mower 2.

When the control unit 20 detects a collision, the lawn mower 2 changes its direction immediately or after traveling backward once and travels again in a direction different from the direction in which the collision has been detected to resume the lawn mowing operation. This enables the lawn mower 2 to smoothly mow the lawn while avoiding the obstacle in the lawn mowing area 4.

The cover 30 includes a feeding opening 32 at a position corresponding to the terminal unit 19. The feeding opening 32 allows the terminal unit 19 and outside of the cover 30 to communicate with each other. The lawn mower 2 is charged by connecting the terminal unit 19 to the charging station 6 through the feeding opening 32.

An emergency stop switch 40 which functions as the "operation unit" is mounted on the upper face of the cover 30. The emergency stop switch 40 of the present embodiment is formed in a substantially rectangular shape in top view of the lawn mower 2 and disposed with the longitudinal direction thereof aligned with a direction perpendicular to the traveling direction of the lawn mower 2. The emergency stop switch 40 is disposed at substantially the center in both the width direction of the main body 10 and the front-rear direction of the main body 10.

The emergency stop switch 40 projects upward at a predetermined height from the upper face of the cover 30.

The emergency stop switch 40 is pressable in the height direction of the lawn mower 2. The user presses the emergency stop switch 40 in the height direction of the lawn mower 2 during travel of the lawn mower 2, which enables the control unit 20 to stop the lawn mowing operation of the lawn mower 2 by stopping the traveling motors 15 and the work unit driving motor 16.

A protection member 50 which functions as the "protection unit" is attached to the upper face of the cover 30. The protection member 50 of the present embodiment includes a combination of lightweight pipe-shaped members and is supported on and fixed to the cover 30.

The protection member 50 includes a pair of side face protection portions 52 and a front face protection portion 54.

As shown in FIG. 4, the pair of side face protection portions 52 includes pipe-shaped members having a predetermined length. The side face protection portions 52 are bent downward at the front end side and the rear end side so as to extend along curved surfaces on the front side and the rear side of the upper face of the cover 30.

An upper face (upper end) of each of the side face protection portions 52 is disposed at a position higher than an upper face of the emergency stop switch 40 in the height direction of the lawn mower 2.

The side face protection portions 52 are disposed with the emergency stop switch 40 interposed therebetween in the width direction of the main body 10, and each of the side face protection portions 52 is disposed with a predetermined space L1 from the emergency stop switch 40.

Each of the side face protection portions 52 is disposed with the longitudinal direction thereof aligned with the traveling direction of the lawn mower 2. One end of each of the side face protection portions 52 is connected to a rear end located on the back face of the cover 30, and the other end thereof is connected to the vicinity of a front end located on the front face of the cover 30, so that each of the side face protection portions 52 is supported on and fixed to the cover 30.

A part of each of the side face protection portions 52 except both ends is disposed above the cover 30 with a predetermined distance from the upper face of the cover 30.

As described above, each of the side face protection portions 52 is bent downward at the front end side and the rear end side along the upper face of the cover 30. That is, both ends of each of the side face protection portions 52 are curved along the upper face of the cover 30. This prevents each of the side face protection portions 52 from excessively projecting from the main body 10 of the lawn mower 2. Thus, the side face protection portions 52 are prevented from coming into contact with an obstacle that has no possibility of coming into contact with the emergency stop switch 40.

The front face protection portion 54 includes a pipe-shaped member having a predetermined length as with the side face protection portions 52 and includes both ends which are located in the right-left direction of the lawn mower 2 and which are bent downward.

As shown in FIG. 5, an upper face (upper end) of the front face protection portion 54 is disposed at a position higher than the upper face of the emergency stop switch 40 in the height direction of the lawn mower 2.

The front face protection portion 54 is disposed at the front side of the emergency stop switch 40 with a predetermined space L2 from the emergency stop switch 40 in the front-rear direction of the main body 10.

The front face protection portion 54 is disposed between the side face protection portions 52, and both ends of the front face protection portion 54 are connected to the respective side face protection portions 52.

Accordingly, the front face protection portion 54 is integrated with and supported on the side face protection portions 52 so as to be located above the cover 30 with a predetermined distance from the upper face of the cover 30.

As described above, the pair of side face protection portions 52 and the front face protection portion 54 are disposed with the predetermined spaces L1, L2 from the emergency stop switch 40, respectively. This enables the user to operate the emergency stop switch 40 without being obstructed by the protection member 50.

As described above, the pair of side face protection portions 52 and the front face protection portion 54 are disposed above the cover 30 with the predetermined distances from the upper face of the cover 30. This enables the protection member 50 to be attached to a plurality of types of covers 30 whose upper faces have different shapes. Moreover, providing the protection member 50 separately from the cover 30 makes it easy to achieve downsizing and weight reduction of the cover 30 as compared to a case where the protection member 50 is integrated with the cover 30.

Note that the upper ends of the pair of the side face protection portions 52 and the upper end of the front face protection portion 54 may have a height substantially equal to the height of the upper face of the emergency stop switch 40.

Next, the action of the present embodiment will be described.

The lawn mower 2 controlled by the control unit 20 mows lawn grass inside the lawn mowing area 4 to a predetermined height by rotating the cutting blade disc 141 while traveling.

The lawn mower 2 of the present embodiment is provided with the protection member 50. As described above, the front face protection portion 54 is disposed at the front side of the emergency stop switch 40. The upper face of the front face protection portion 54 is disposed at the position higher than the upper face of the emergency stop switch 40. Thus, when the lawn mower 2 during traveling approaches an obstacle, such as a solar panel, located above the lawn mower 2 from the front face side, the front face protection portion 54 comes into contact with the obstacle, which prevents the emergency stop switch 40 from coming into contact with the obstacle.

Similarly, as described above, the side face protection portions 52 are disposed at the respective lateral sides of the emergency stop switch 40. For example, when the lawn mower 2 during traveling turns or moves parallel in the right-left direction and thus approaches an obstacle located above the lawn mower 2 from the side face of the lawn mower 2, the side face protection portion 52 comes into contact with the obstacle, which prevents the emergency stop switch 40 from coming into contact with the obstacle.

In this manner, the protection member 50 provided in the lawn mower 2 prevents the emergency stop switch 40 from coming into contact with the obstacle located above the lawn mower 2.

Moreover, since the protection member 50 is fixed to the cover 30, a displacement occurs between the housing 11 and the cover 30 also when the protection member 50 makes contact with an obstacle. The displacement sensor 24 detects the displacement, and the control unit 20 acquires a signal from the displacement sensor 24, so that the control unit 20 detects a collision between the lawn mower 2 and the obstacle.

That is, also when the protection member 50 makes contact with an obstacle located above the lawn mower 2, the control unit 20 can detect a collision with the obstacle as with an obstacle located on the traveling surface S.

The control unit 20 causes the lawn mower 2 to change its direction and then travel again in a direction different from the direction in which the collision has been detected to resume the lawn mowing operation. This enables the lawn mower 2 to smoothly mow the lawn while avoiding the obstacle located above the lawn mower 2.

As described above, according to the present embodiment, the lawn mower 2 includes the emergency stop switch 40 having a shape projecting upward from the cover 30. The emergency stop switch 40 is pressed from the upper face, which causes the control unit 20 to stop the lawn mowing operation of the lawn mower 2. The lawn mower 2 further includes the front face protection portion 54 which is located at the front side in the traveling direction of the lawn mower 2 relative to the emergency stop switch 40 and disposed at the height equal to or higher than the upper end of the emergency stop switch 40.

According to this configuration, the front face protection portion 54 protects the emergency stop switch 40 from the front side, which prevents the emergency stop switch 40 from coming into contact with an obstacle located above the lawn mower 2. Thus, it is possible to prevent the obstacle from stopping the lawn mowing operation of the lawn mower 2 by pressing the emergency stop switch 40.

According to the present embodiment, the lawn mower 2 includes the pair of side face protection portions 52 at the lateral sides of the emergency stop switch 40. This prevents the emergency stop switch 40 from coming into contact with an obstacle from the lateral side in the traveling direction of the lawn mower 2.

According to the present embodiment, the pair of side face protection portions 52 and the front face protection portion 54 are disposed with the predetermined spaces L1, L2 from the emergency stop switch 40, respectively. This enables the user to operate the emergency stop switch 40 without being obstructed by the protection member 50.

According to the present embodiment, the protection member 50 includes the pipe-shaped member. This enables the protection member 50 to have a predetermined strength while preventing increase in the weight of the lawn mower 2.

Next, a modification of the present invention will be described.

Figure 6:
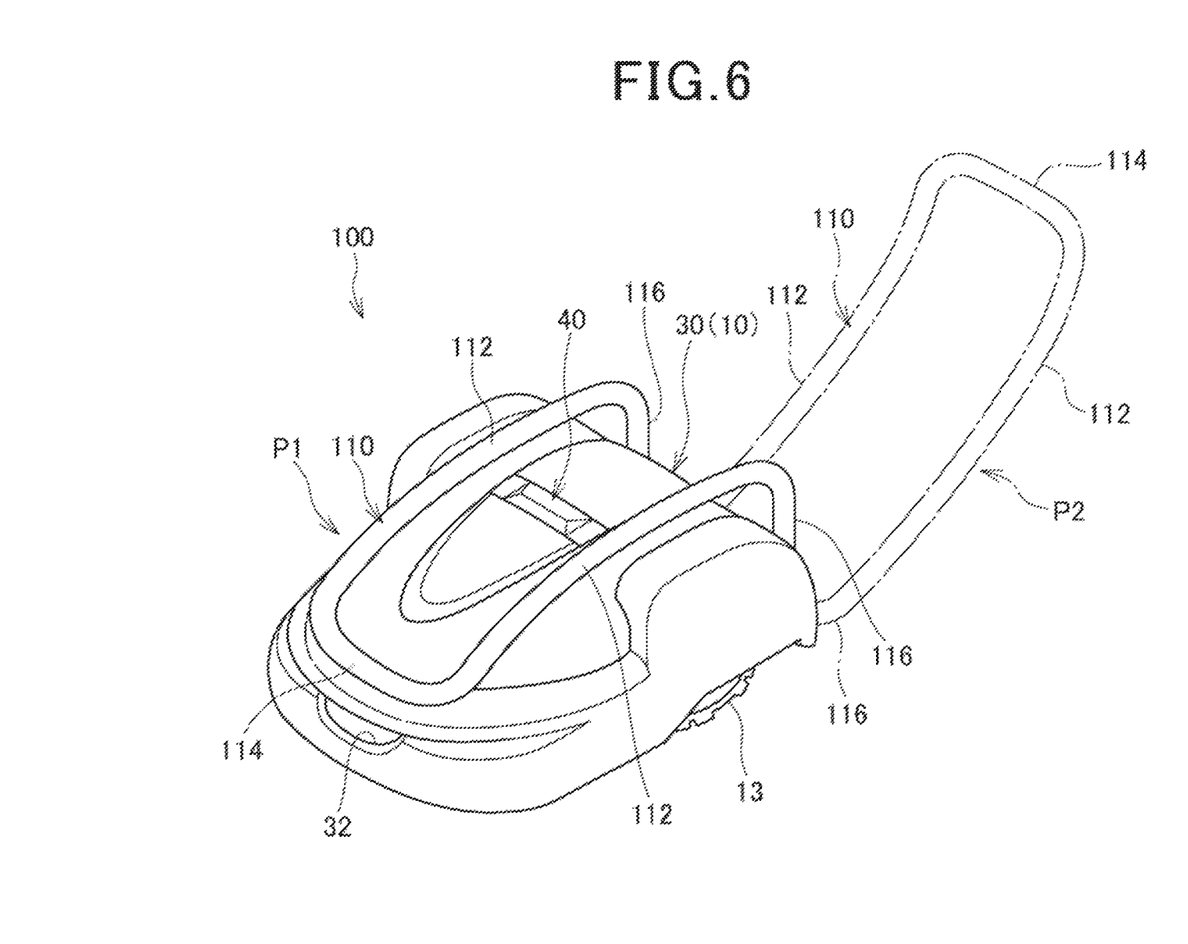
FIG. 6 is a perspective view showing the configuration of a lawn mower according to a modification of the present invention.
Figure 7:
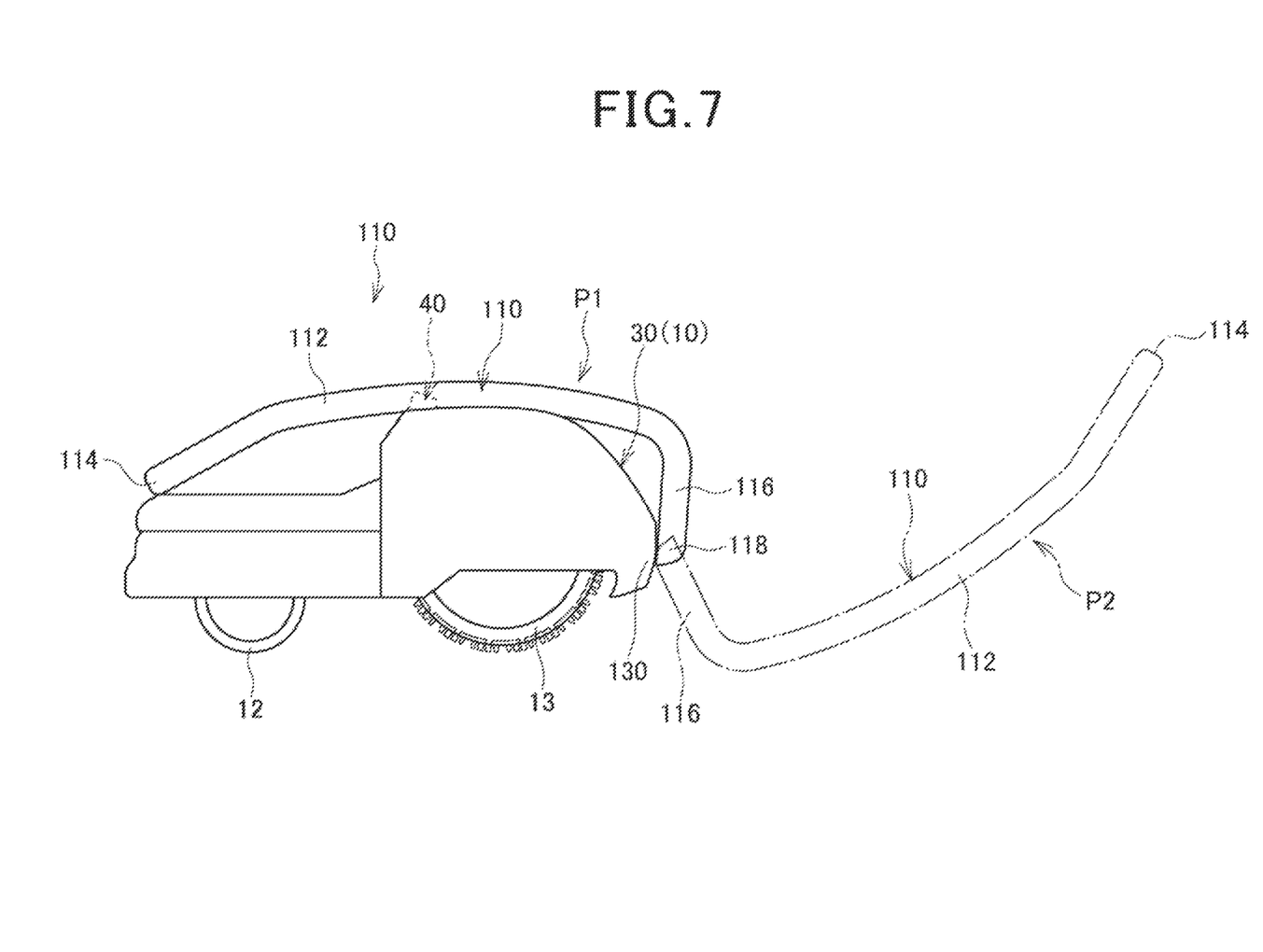
FIG. 7 is a side view showing the configuration of the lawn mower according to the modification of the present invention.

FIG. 6 is a perspective view of a lawn mower 100 according to the modification of the present invention, and FIG. 7 is a side view of the lawn mower 100.

In FIGS. 6 and 7, parts identical to those in FIGS. 2 to 5 are designated by the same reference signs to omit redundant description.

As shown in FIGS. 6 and 7, the lawn mower 100 of the present modification includes a protection member 110 instead of the protection member 50 of the lawn mower 2 of the above embodiment.

As with the protection member 50, the protection member 110 is formed by bending a lightweight pipe-shaped material. The protection member 110 includes a pair of side face protection portions 112.

The pair of side face protection portions 112 includes pipe-shaped members having a predetermined length. The side face protection portions 112 extend in the traveling direction of the lawn mower 100 from the rear side through the front side of the lawn mower 100 on the upper face of the cover 30.

The side face protection portions 112 are disposed with the emergency stop switch 40 interposed therebetween in a direction perpendicular to the traveling direction of the lawn mower 100. Each of the side face protection portions 112 is disposed with a predetermined space from the emergency stop switch 40. An upper face of each of the side face protection portions 112 is disposed at a position higher than the upper face of the emergency stop switch 40 in the height direction of the lawn mower 100.

The protection member 110 includes a grip portion 114 which integrally couples ends of the side face protection portions 112, the ends being located at the front face side of the lawn mower 100, and is formed in a U shape as a whole.

The grip portion 114 includes a pipe-shaped member having a predetermined length as with the pair of the side face protection portions 112 and extends in the direction perpendicular to the traveling direction of the lawn mower 100. In the present embodiment, the grip portion 114 is disposed near the front end of the cover 30.

The protection member 110 further includes bent portions 116 which are formed by bending ends of the side face protection portions 112 downward, the ends being located at the back face side of the lawn mower 100.

The protection member 110 is coupled to the cover 30 by turnably connecting a pair of ends 118 of the bent portions 116 to a rear end 130 of the cover 30. This enables the protection member 110 to turn about the pair of ends 118, which is the fixed point and serves as a turning center, from an operation position P1 where the protection member 110 is located on the upper face of the cover 30 to a carry position P2 where the protection member 110 extends rearward of the lawn mower 100.

The protection member 110 is disposed at the operation position P1 when the lawn mower 100 performs the lawn mowing operation. This protects the emergency stop switch 40 and prevents the emergency stop switch 40 from coming into contact with an obstacle located above the lawn mower 100 as with the protection member 50. Thus, it is possible to prevent the obstacle from stopping the lawn mowing operation of the lawn mower 100 by pressing the emergency stop switch 40.

The protection member 110 is disposed at the carry position P2 when the user carries the lawn mower 100. At this time, the protection member 110 functions as a handle for the user to carry the lawn mower 100.

Specifically, the user turns the protection member 110 from the operation position P1 to the carry position P2 in a state where driving of the lawn mower 100 is stopped. Then, the user can carry the lawn mower 100 by gripping the grip portion 114 of the protection member 110.

In this manner, the protection member 110 is connected to the cover 30 turnably about the pair of ends 118, which is connected to the rear end 130 of the cover 30 and serves as the turning center, and thus functions as the protection unit that protects the emergency stop switch 40 and the handle for the user to carry the lawn mower 100.

The above embodiment describes, as an example, one aspect of the present invention, and any modifications and applications can be made without departing from the gist of the present invention.

For example, instead of the protection member 50, the cover 30 may be formed to include projections that are formed on the upper face of the cover 30 to cover the front face, the back face, and each side face of the emergency stop switch 40, and these projections may serve as the protection unit for the emergency stop switch 40.

For example, the protection member 50 may be attachable to and detachable from the cover 30 by the user. In this case, the protection member 50 is fixed to the cover 30 to the extent that the protection member 50 does not come off the cover 30 when making contact with an obstacle. According to this configuration, for example, when it is obvious that there is no obstacle that is located above the lawn mower 2 in the lawn mowing area 4, the user can allow the lawn mower 2 to execute the lawn mowing operation with the protection member 50 detached. Moreover, the lawn mower 2 can be easily reduced in size and weight by attaching and detaching the protection member 50 to and from the cover 30 as necessary by the user as compared to the case where the protection member 50 is integrated with the cover 30 or the case where the cover 30 includes the projections.

For example, the protection member 50 may include only either the pair of side face protection portions 52 or the front face protection portion 54. When the lawn mower 2 includes only the front face protection portion 54, the front face protection portion 54 is directly fixed to the cover 30.

For example, when the lawn mower 2 is a robot lawn mower that is movable backward, the lawn mower 2 may include a back face protection portion on the rear end of the main body 10. When the lawn mower 2 moves backward and approaches an obstacle located above the lawn mower 2 from the back face side, the back face protection portion comes into contact with the obstacle, which prevents the emergency stop switch 40 from coming into contact with the obstacle.

For example, in the above embodiment, the "operation unit" is the emergency stop switch 40. However, the "operation unit" is not limited thereto and may be a switch that transmits the start of the lawn mowing operation to the control unit 20 or an input device for inputting a command of the user to the lawn mower 2, such as a keyboard or a touch panel.

REFERENCE SIGNS LIST 1 unattended lawn mowing system
2, 100 robot lawn mower, lawn mower
4 lawn mowing area
10 main body
11 housing
12 front wheel (wheel)
13 rear wheel (wheel)
14 work unit
15 traveling motor (driving unit)
16 work unit driving motor
20 control unit
24 displacement sensor (detection unit)
30 cover
40 emergency stop switch (operation unit)
50, 110 protection member (protection unit)
52, 112 side face protection portion
54 front face protection portion
L1, L2 space

What is claimed is:

1. An autonomous travel work machine comprising a main body and a wheel, the autonomous travel work machine being configured to execute a predetermined operation on an operation target while causing the main body to autonomously travel with the wheel, the autonomous travel work machine comprising:
an operation unit having a shape projecting from an upper face of the main body, the operation unit being operated by being pressed from an upper face side; and
a protection unit being disposed at a height equal to or higher than an upper end of the operation unit, wherein the protection unit includes a front side protection portion and a lateral side protection portion, the front side protection portion is located at a front side in a traveling direction of the main body relative to the operation unit and prevents the operation unit from coming into contact with an obstacle from the front side, the lateral side protection portion is located at a lateral side in the traveling direction of the main body relative to the operation unit and prevents the operation unit from coming into contact with an obstacle from the lateral side.

2. The autonomous travel work machine according to claim 1, wherein the protection unit is disposed with a predetermined space from the operation unit.

3. The autonomous travel work machine according to claim 1, wherein the protection unit includes a pipe-shaped member.

4. The autonomous travel work machine according to claim 1, wherein the protection unit is fixed to the main body at a predetermined fixed point and attached to the main body turnably about the fixed point serving as a turning center.

5. The autonomous travel work machine according to claim 1, wherein the protection unit is detachably attached to the main body.

6. The autonomous travel work machine according to claim 1, wherein
the main body includes:
a driving unit configured to drive the wheel to cause the main body to travel;
a work unit configured to execute the predetermined operation on the operation target; and
a control unit configured to control the driving unit and the work unit, and
the control unit performs control to stop the driving unit and the work unit by the operation unit being pressed.

7. The autonomous travel work machine according to claim 1, wherein the protection unit includes a pair of lateral side protection portions that are located at both lateral sides with respect to the operation unit.

8. An autonomous travel work machine comprising a main body and a wheel, the autonomous travel work machine being configured to execute a predetermined operation on an operation target while causing the main body to autonomously travel with the wheel, the autonomous travel work machine comprising:
an operation unit having a shape projecting from an upper face of the main body, the operation unit being operated by being pressed from an upper face side; and
a protection unit being disposed at a height equal to or higher than an upper end of the operation unit, and is located at a front side in a traveling direction of the main body relative to the operation unit and prevents the operation unit from coming into contact with an obstacle from the front side, wherein
the protection unit is fixed to the main body at a predetermined fixed point and attached to the main body turnably about the fixed point serving as a turning center.

9. The autonomous travel work machine according to claim 8, wherein
the protection unit is provided so as to turn between a first position and a second position, the first position is where the protection unit is located adjacent to the main body and the second position is where the protection unit is located separately from the main body, and the protection unit includes a grip portion held by a user when the protection unit is at the second position.

* * * * *